(12) United States Patent
Inoue

(10) Patent No.: US 6,774,948 B1
(45) Date of Patent: Aug. 10, 2004

(54) VERTICALLY EXTENSIBLE AND RETRACTIBLE LENS ARM

(76) Inventor: Sumio Inoue, 8-423 Oyabu-cho Kuze Minami-ku, Kyoto-city, Kyoto (JP)

( * ) Notice: Subject to any disclaimer, the term of this patent is extended or adjusted under 35 U.S.C. 154(b) by 743 days.

(21) Appl. No.: 09/689,777

(22) Filed: Oct. 13, 2000

(51) Int. Cl.[7] .......................... H04N 5/225; G03B 17/00
(52) U.S. Cl. ...................... 348/374; 348/335; 396/428
(58) Field of Search ................................ 348/335, 373, 348/374, 375; 396/529, 530, 531, 71, 383, 428, 535

(56) References Cited

U.S. PATENT DOCUMENTS

| | | | | |
|---|---|---|---|---|
| 1,486,231 A | * | 3/1924 | Cox ........................... | 396/386 |
| 4,530,580 A | * | 7/1985 | Ueda et al. .................. | 396/425 |
| 5,065,249 A | * | 11/1991 | Horn et al. .................. | 348/376 |
| 5,761,550 A | * | 6/1998 | Kancigor .................... | 396/176 |
| 5,767,905 A | * | 6/1998 | Archambo .................. | 348/373 |
| 6,091,453 A | * | 7/2000 | Coan et al. .................. | 348/373 |
| 6,384,741 B1 | * | 5/2002 | O'Leary, Sr. ............... | 340/937 |
| 6,384,863 B1 | * | 5/2002 | Bronson ..................... | 348/373 |

FOREIGN PATENT DOCUMENTS

| | | | | |
|---|---|---|---|---|
| JP | 04295886 A | * | 10/1992 | ............ G09G/5/00 |

* cited by examiner

*Primary Examiner*—Ngoc-Yen Vu
*Assistant Examiner*—Timothy J. Henn
(74) *Attorney, Agent, or Firm*—McDermott Will & Emery LLP

(57) ABSTRACT

A vertically extensible and retractible lens arm for a camera includes a plurality of hollow telescoping sections that slide one within another. A lens for taking a picture is connected to a top telescoping section. Each telescoping section except the top one has a generally semicircular hollow space that becomes narrower toward a bottom of the telescoping section and is adapted to receive the lens therein when the lens arm is retracted. The top telescoping section can be provided with only a projecting part at the outside of the lower portion of each of opposite side walls whereas each telescoping section except the top one can be provided both with a notch at the inside of the upper portion of each of opposite side walls and with a projecting part at the outside of the lower portion of each of the opposite side walls.

6 Claims, 5 Drawing Sheets

VERTICALLY EXTENSIBLE AND RETRACTIBLE LENS ARM

FIELD OF THE INVENTION

This invention relates to a vertically extensible and retractible lens arm for a camera, particularly a video camera or digital camera.

BACKGROUND OF THE INVENTION

Conventionally, it has been possible to move a camera lens forward and backward relative to the camera body in a horizontal plane but no mechanism has been proposed that either can be formed integrally with the camera body or can be connected therewith as a part supplied separately and that makes it possible to move the camera lens relative to the camera body in a vertical plane. Therefore, it has conventionally been impossible to take a picture of an object which one cannot see with one's own eyes because of the presence in front of one, of other things or people that interrupt one's view of that object, without using a stepladder or similar tool. However, if the above-mentioned mechanism is available, one will be able to take a picture of such an object without using such a tool.

SUMMARY OF THE INVENTION

Accordingly, it is an object of this invention to make it possible to take a picture of an object which one cannot see with one's own eyes, or with one's own height, because of the presence in front of one, of other things or people that interrupt one's view of that object, without using a stepladder or similar tool.

Another object of the invention is to provide a lens arm which either can be formed integrally with a camera body or can be connected therewith as a part supplied separately which makes it possible to move a camera lens relative to the camera body in a vertical plane.

Still another object of the invention is to provide such a lens arm for a video camera or digital camera.

A further object of the invention is to provide a vertically extensible and retractible lens arm which either can be formed integrally with a camera body or can be connected therewith as a part supplied separately.

Still another object of the invention is to provide such a vertically extensible and retractible lens arm for a video camera or digital camera.

DETAILED DESCRIPTION OF THE INVENTION

Figure 1:
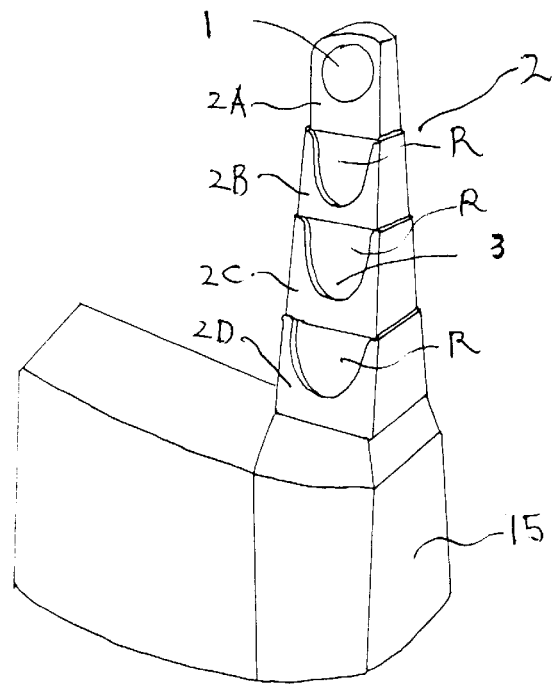
FIGS. 1 and 2 each show a video camera with an extensible and retractible lens arm of this invention which is formed integrally with a camera body.
Figure 2:
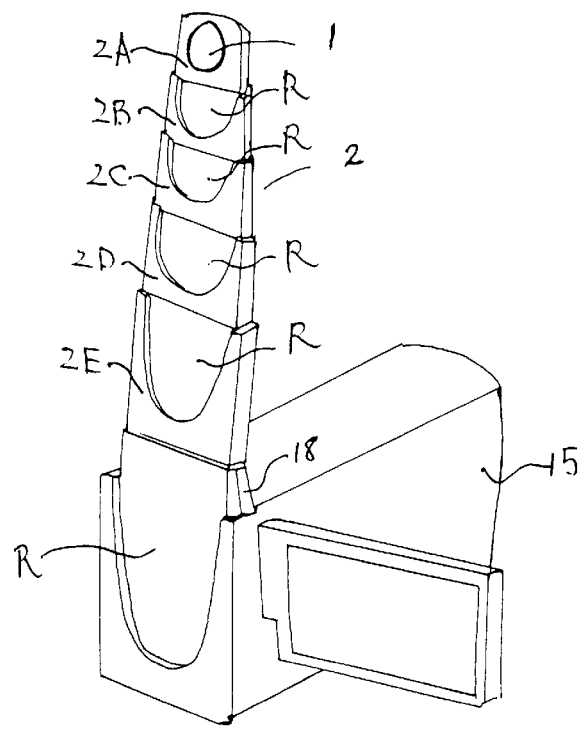

FIGS. 1 and 2 each show a video camera with a lens arm 2 of this invention which is formed integrally with a camera body 15. The lens arm 2 of FIG. 1 illustratively comprises four telescoping sections 2A to 2D. Also, the lens arm 2 of FIG. 2 illustratively comprises five telescoping sections 2A to 2E. The top telescoping section 2A has a lens 1. Each telescoping section is hollow. Also, each telescoping section except the top one 2A has a generally semicircular recess R that becomes narrower toward its bottom.

In the drawings either lens arm 2 is shown as being fully extended. As the names imply, these telescoping sections can be made to slide one within another. That is, the top telescoping section 2A with the lens 1 can be made to slide within the second section 2B, the second section 2B to slide within the third section 2C, and the third section 2C to slide within the fourth section 2D. With the lens arm 2 of FIG. 2, the fourth section 2D, which has thus accommodated the four sections 2A TO 2D, also can be made to slide within the fifth section 2E. It will be appreciated that during this telescoping motion the lens 1 connected to the top section 2A is successively received in the recess R of the second section 2B, the recess R of the third section 2C, and the recess R of the fourth section 2D in the order mentioned. Additionally, with the lens arm 2 of FIG. 2, the lens 1 received in the fourth section 2D is further received in the recess R of the lowermost section 2E. Moreover, with the lens arm 2 of FIG. 1, the lowermost telescoping section 2D, which has accommodated the upper telescoping sections 2A, 2B and 2C and has received the lens 1 therein, can be made to slide within the camera body 15. The lens arm 2 of FIG. 1 thus can be entirely retracted into the camera body 15. Similarly, with the lens arm 2 of FIG. 2, the lowermost section 2E, which has accommodated the upper sections 2A to 2D and has received the lens 1 therein, can be slided into a recess R formed in the front face of the camera body 15. Thus, the lens arm 2 of FIG. 2 also can be entirely retracted into the camera body 15. The lens arms 2 of FIGS. 1 and 2 are thus retractible and extensible arms. The arm 2 can be extended as shown in FIG. 1 or 2 only by taking up the top telescoping section 2A with fingers and pulling out the arm 2.

When the lens arm 2 of FIG. 2 is in its extended state as shown in FIG. 2, its lowest telescoping section 2E is supported by two opposed vertical support members 18, 18 projecting upwardly from the camera body 15.

Figure 8:
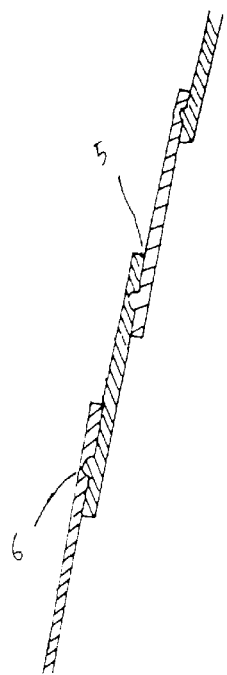
FIG. 8 illustrates a construction of the lens arm of this invention that makes it possible to fix it in an extended state.

With either lens arm 2, each telescoping section except the top one 2A is provided with a notch 6 at the inside of the upper portion of each of the opposed side walls thereof and with a projecting part 5 at the outside of the lower portion of each of the opposed side walls thereof (FIG. 8 shows only one of the opposed side walls of each telescoping section), and the top telescoping section 2A is only provided with a projecting part at the outside of the lower portion of each of its opposed walls.

With either lens arm 2, the two projecting parts of the top telescoping section 2A are adapted to engage with the respective notches 6 of the second section 2B, and the two projecting parts 5 of each of the telescoping sections that follow are adapted to engage with the respective notches 6 of the immediately next section. Moreover, with the lens arm 2 of FIG. 1, the two projecting parts 5 of the lowermost section 2D are adapted to engage with two notches (not shown) formed in the camera body 15, respectively. Also, with the lens arm 2 of FIG. 2, the two projecting parts 5 of the lowermost section 2E are adapted to engage with two notches, one being formed in one of the support members 18 and the other being formed in the other support member 18, respectively.

With either lens arm 2, in the illustrated extended state thereof the projecting parts are in such engagement with the notches, thereby fixing the lens arm 2 in the illustrated extended state.

When the arm 2 is retracted into the camera body 15, the projecting parts are disengaged from the notches.

It will be appreciated that either lens arm 2 can be so extended that only a desired number of telescoping sections project from the camera body 15, instead of being fully extended as illustrated in FIG. 1 or 2. For example, it is possible to make only the upper three telescoping sections 2A, 2B, and 2C project from the camera body 15. By so doing, one can change the exposed height of the lens arm 2.

Figure 3:
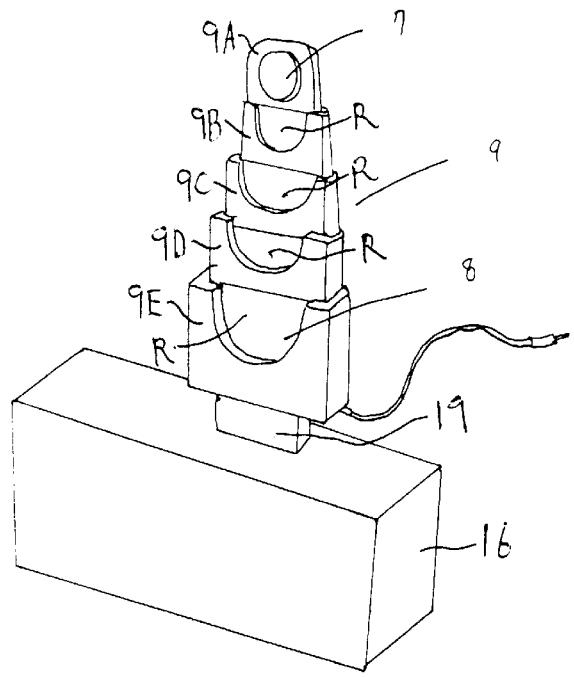
FIGS. 3 and 4 each depict a video camera with an extensible and retractible lens arm of this invention which is not formed integrally with a video camera body but is connected therewith as a part supplied separately.
Figure 4:
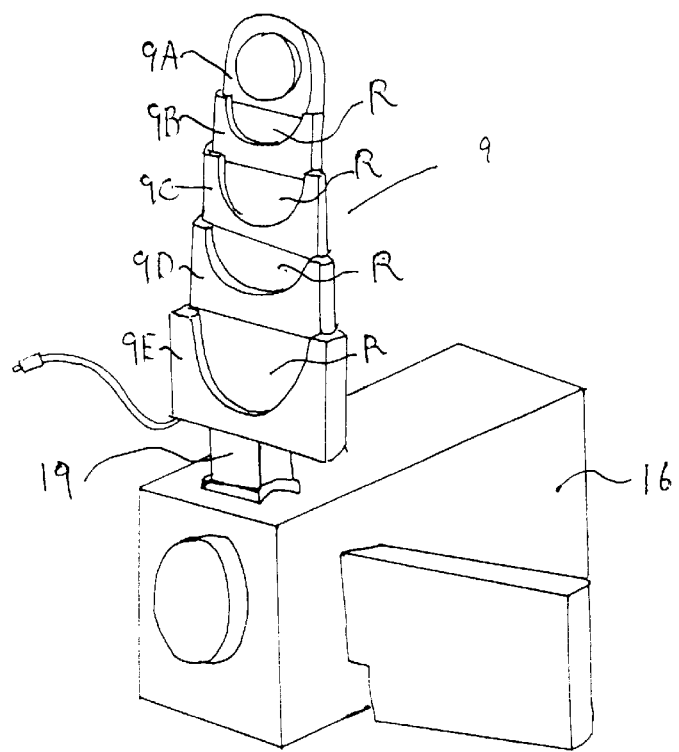

FIGS. 3 and 4 depict different lens arms 9 of the invention. Unlike the lens arms 2 of FIGS. 1 and 2, either lens arm 9 is not formed integrally with a video camera body 16 but is connected therewith as a part supplied separately. Either lens arm 9 illustratively comprises four telescoping sections 9A to 9E. As with the lens arms 2, each telescoping section is hollow. Also, with either lens arm 9, its top telescoping section 9A has a lens 7, and the bottom section 9E is supported on a vertical support member 19 projecting upwardly from the top of the camera body 16. As with the lens arms 2 of FIGS. 1 and 2, each telescoping section except the top one 9A has a generally semicircular recess R that becomes narrower toward its bottom and is adapted to receive the lens 7 therein.

With either lens arm 9, each of the middle three telescoping sections 9B, 9C and 9D are provided with a notch at the inside of the upper portion of each of the opposed side walls thereof and with a projecting part at the outside of the lower portion of each of the opposed side walls thereof. The top telescoping section 9A is only provided with a projecting part at the outside of the lower portion of each of its opposed walls, whereas the lowest telescoping section 9E is only provided with a notch at the inside of the upper portion of each of the opposed side walls thereof.

Figure 5:
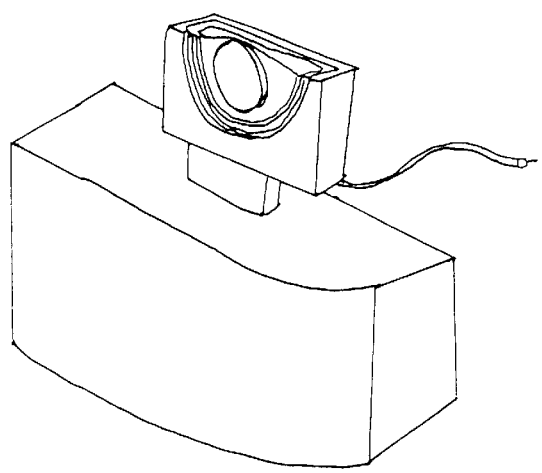
FIG. 5 illustrates a fully retracted state of the lens arm of FIG. 3.
Figure 6:
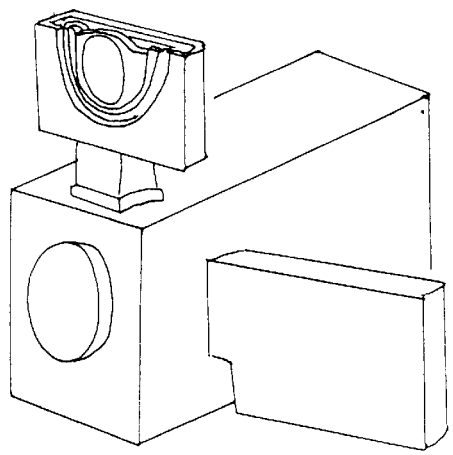
FIG. 6 illustrates a fully retracted state of the lens arm of FIG. 4.

In the drawings, like the lens arms 2, either lens arm 9 is shown as being fully extended. With either lens arm 9, in the illustrated extended state thereof the projecting parts of each telescoping section, except for the lowest section 9E, are in engagement with the respective notches of the immediately next section, thereby fixing the lens arm 9 in the illustrated extended state. As with the lens arms 2, one can push either lens arm 9 down to retract it as shown in FIG. 5 or 6. As with the lens arms 2, when it is pushed down, the projecting parts are disengaged from the notches. In FIGS. 5 and 6 the lens arms 9, are in fully retracted states. As illustrated, unlike the lens arms 2, in its fully retracted state either lens arm 9 is not inside the camera body 16 but is still being exposed above it.

Figure 9:
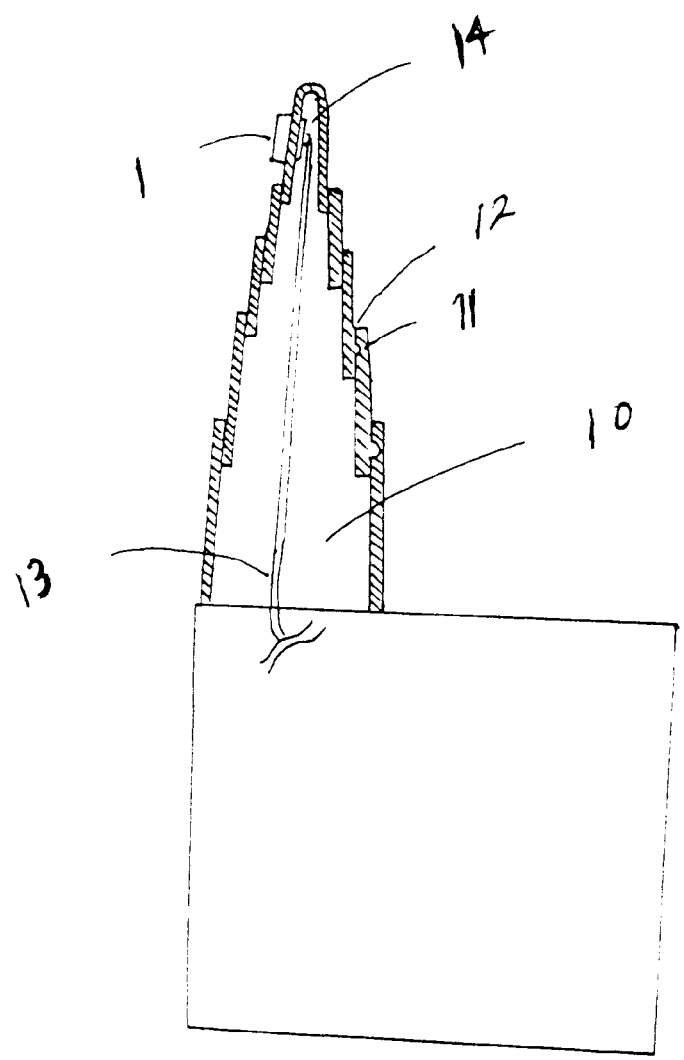
FIG. 9 shows a CCD camera and output terminal which can be provided in the lens arm.

With either lens arm 9, which is, to repeat, not formed integrally with the camera body 16 but is connected therewith as a part supplied separately, it is necessary to provide the inner space of the arm 9 with an output terminal (13 of FIG. 9) for sending image information from the lens 7 to an input terminal of the camera body 16 and other required fittings. Alternatively, one can provide the inner space with a CCD camera (14 of FIG. 9) and connect this CCD camera to the input terminal of the camera body 16 by means of an optical line such as an optical fiber.

Figure 7:
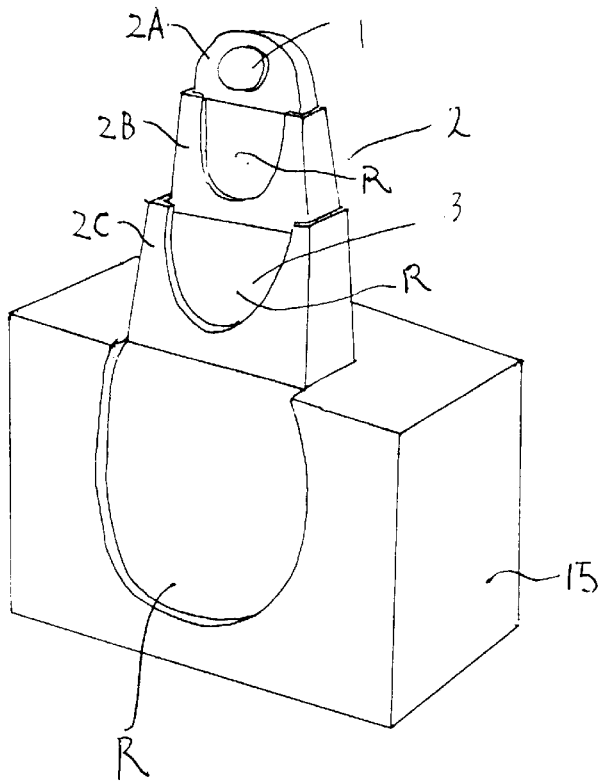
FIG. 7 shows a digital camera with an extensible and retractible lens arm of this invention which is formed integrally with a camera body.

FIG. 7 depicts a digital camera with a lens arm 2 of this invention which is formed integrally with a camera body 15. This lens arm 2 of FIG. 7 illustratively comprises three telescoping sections 2A, 2B and 2C. This lens arm has a similar construction to any one of the above-mentioned lens arms, and like the lens arms of FIGS. 1 and 2 this lens arm of FIG. 7 can be entirely retracted into the camera body 15. To be more exact, this lens arm 2 of FIG. 7, like the lens arm 2 of FIG. 2, can be entirely retracted into a generally semicircular recess R formed in the front face of the camera body 15.

It will be readily appreciated that the lens arm of this invention makes it possible to take a picture from a height or angle which is usually unavailable without using a stepladder or similar tool. Therefore, if one desires to take a picture of an object which one cannot see with one's own eyes because of the presence in front of one, of other objects or people that interrupt one's view of that desired object, one is able to take that picture by using the lens arm of this invention.

What is claimed is:

1. A vertically extensible and retractible lens arm for either one of a video camera or digital camera, which comprises a plurality of hollow telescoping sections that can be made to slide one within another, a lens for taking a picture of a desired object being connected to a top one of said telescoping sections, each of said telescoping sections except said top one having a generally semicircular hollow space R that becomes narrower toward a bottom of the telescoping section and that is adapted to receive said lens therein when the lens arm is retracted, said top one of said telescoping sections being provided with a projecting part (5) at the outside of the lower portion of each of opposite side walls thereof, each said telescoping section except said top one being provided with a notch (6) at the inside of the upper portion of each of opposite side walls thereof and with a projecting part (5) at the outside of the lower portion of each of the opposite side walls thereof, the two projecting parts (5) of each said telescoping section except a lowermost one of said telescoping sections being adapted to engage with the two notches (6) of an immediately next one of said telescoping sections, respectively, and the two projecting parts (5) of the lowermost telescoping section being adapted to engage with two opposite notches formed in a camera body, respectively.

2. A video camera having the lens arm of claim 1 which is formed integrally with a camera body.

3. A digital camera having the lens arm of claim 1 which is formed integrally with a camera body.

4. A video camera with a vertically extensible and retractible lens arm (2) which is formed integrally with a camera body (15) and which comprises a plurality of hollow telescoping sections that can be made to slide one within another, a lens for taking a picture of a desired object being connected to a top one of said telescoping sections, a lowermost one of said telescoping sections being supported on two opposite vertical support members (18, 18) projecting upwardly from the top of said camera body (15), each of said telescoping sections except said top one having a generally semicircular hollow space (R) that becomes narrower toward a bottom of the telescoping section and that is adapted to receive said lens therein when the lens arm is retracted, said top one of said telescoping sections being provided with a projecting part (5) at the outside of the lower portion of each of opposite side walls thereof, each said telescoping section except said top one being provided both with a notch (6) at the inside of the upper portion of each of opposite side walls thereof and with a projecting part (5) at the outside of the lower portion of each of the opposite side walls thereof, the two projecting parts (5) of each said telescoping section except the lowermost telescoping section being adapted to engage with the two notches 6 of an immediately next one of said telescoping sections, respectively, the two projecting parts (5) of the lowermost telescoping section being adapted to engage with a notch formed in the inner face of one (18) of said vertical support members and a notch formed in the inner face of the other vertical member (18), respectively, and said camera body (15) having in its front face a hollow space (R) into which said lens arm can be entirely retracted.

5. A video camera with a vertically extensible and retractible lens arm (9) which is not formed integrally with a camera body (16) but is connected therewith as a part supplied separately and which comprises a plurality of hollow telescoping sections that can be made to slide one within another, said lens arm being supported on a vertical support member (19) projecting upwardly from the top of the camera body (16), a lens for taking a picture of a desired object being connected to a top one of said telescoping sections, each said telescoping section except said top one having a generally semicircular hollow space (R) that becomes narrower toward a bottom of the telescoping section and that is adapted to receive said lens therein when the lens arm (9) is retracted, said top one of said telescoping sections being provided with a projecting part (5) at the outside of the lower portion of each of opposite side walls thereof, a lowermost one of said telescoping sections being provided with a notch (6) at the inside of the upper portion of each of opposite side walls thereof, each said telescoping section except the top and lowermost telescoping sections being provided both with a notch (6) at the inside of the upper portion of each of opposite side walls thereof and with a projecting part (5) at the outside of the lower portion of each of the opposite side walls thereof, and the two projecting parts (5) of each said telescoping section, except for the lowermost telescoping section, being adapted to engage with the two notches (6) of an immediately next one of said telescoping sections, respectively.

6. A digital camera with a vertically extensible and retractible lens arm (2) which is formed integrally with a camera body (15) and which comprises a plurality of hollow telescoping sections that can be made to slide one within another, a lens for taking a picture of a desired object being connected to a top one of said telescoping sections, each said telescoping section except said top one having a generally semicircular hollow space (R) that becomes narrower toward a bottom of the telescoping section and that is adapted to receive said lens therein when the lens arm is retracted, said top one of said telescoping sections being provided with a projecting part (5) at the outside of the lower portion of each of opposite side walls thereof, each said telescoping section except the top telescoping section being provided both with a notch (6) at the inside of the upper portion of each of opposite side walls thereof and with a projecting part (5) at the outside of the lower portion of each of the opposite side walls thereof, said camera body also having in its front face a generally semicircular recess (R) into which said lens arm can be entirely retracted, the two projecting parts (5) of each said telescoping section except a lowermost one of said telescoping sections being adapted to engage with the two notches (6) of an immediately next one of said telescoping sections, respectively, and the two projecting parts (5) of the lowermost telescoping section being adapted to engage with two opposite notches formed in said recess (R) of said camera body (15), respectively.

* * * * *